US009993795B2

(12) United States Patent
Kulkarni et al.

(10) Patent No.: US 9,993,795 B2
(45) Date of Patent: Jun. 12, 2018

(54) GLASS LINED METAL MICRO-REACTOR (71) Applicant: Council of Scientific & Industrial Research, New Delhi (IN)

(72) Inventors: Amol A. Kulkarni, Pune (IN); Vivek V. Ranade, Pune (IN)

(73) Assignee: The Council of Scientific & Industrial Research, New Delhi (IN)

( * ) Notice: Subject to any disclaimer, the term of this patent is extended or adjusted under 35 U.S.C. 154(b) by 33 days.

(21) Appl. No.: 15/103,623

(22) PCT Filed: Dec. 12, 2014

(86) PCT No.: PCT/IN2014/000774
§ 371 (c)(1),
(2) Date: Jun. 10, 2016

(87) PCT Pub. No.: WO2015/087354
PCT Pub. Date: Jun. 18, 2015

(65) Prior Publication Data
US 2016/0317996 A1 Nov. 3, 2016

(30) Foreign Application Priority Data

Dec. 12, 2013 (IN) .......................... 3621/DEL/2013

(51) Int. Cl.
*B01J 19/00* (2006.01)
*B01J 19/02* (2006.01)

(52) U.S. Cl.
CPC .......... *B01J 19/0093* (2013.01); *B01J 19/02* (2013.01); *B01J 2219/0084* (2013.01); *B01J 2219/0086* (2013.01); *B01J 2219/0099* (2013.01); *B01J 2219/00783* (2013.01); *B01J 2219/00804* (2013.01); *B01J 2219/00806* (2013.01); *B01J 2219/00822* (2013.01);
(Continued)

(58) Field of Classification Search
CPC ................... B01J 19/0093; B01J 19/02; B01J 2219/0209; B01J 2219/0084; B01J 2219/00873; B01J 2219/00869; B01J 2219/00867; B01J 2219/00831; B01J 2219/00822; B01J 2219/00806; B01J 2219/00783; B01J 2219/0086
See application file for complete search history.

(56) References Cited

U.S. PATENT DOCUMENTS 5,580,523 A * 12/1996 Bard .................... B01J 19/0093
210/198.2
5,690,763 A * 11/1997 Ashmead .............. B01F 5/0604
156/252

(Continued)

*Primary Examiner* — Lessanework Seifu
(74) *Attorney, Agent, or Firm* — Locke Lord LLP; Daniel J. Fiorello; Joshua L. Jones (57) ABSTRACT

The invention discloses a glass lined metal micro-reactor with enhanced heat transfer efficiency in continuous flow operation. More particularly, the invention discloses a glass lined micro-reactor that can be reassembled. The invention provides a novel glass lined metal micro-reactor with micro fluidic channels that provide a better mixing, better heat exchange, and better temperature control. The micro fluidic channels machined in the glass lined metal reactor/mixer may be straight, curved, lamellar, flower shaped, or spiral such that the cross sectional area of the micro fluidic channel is configured to suit the cross sectional area of the micro-reactor.

10 Claims, 7 Drawing Sheets

(52) U.S. Cl.
CPC ......... *B01J 2219/00831* (2013.01); *B01J 2219/00867* (2013.01); *B01J 2219/00869* (2013.01); *B01J 2219/00873* (2013.01); *B01J 2219/0209* (2013.01)

(56) References Cited

U.S. PATENT DOCUMENTS

| | | | | |
|---|---|---|---|---|
| 6,409,072 | B1* | 6/2002 | Breuer | B01J 19/0093 156/60 |
| 2003/0190563 | A1* | 10/2003 | Nagasawa | B01F 5/0453 430/569 |
| 2012/0076705 | A1* | 3/2012 | Kockmann | B01J 19/0093 422/198 |

* cited by examiner

GLASS LINED METAL MICRO-REACTOR

CROSS REFERENCE TO RELATED APPLICATIONS

This application is a 35 U.S.C. § 371 National Phase Application of International PCT Patent Application No. PCT/IN20014/000774, filed Dec. 12, 2014 which application claims the benefit of priority to Indian Patent Application No. 3621/DEL/2013, filed Dec. 12, 2013, the contents of each of which are hereby incorporated herein by reference in their entirety.

FIELD OF THE INVENTION

The invention relates to a glass lined metal micro-reactor. Particularly, the invention discloses a glass lined metal micro-reactor with enhanced heat transfer efficiency in continuous flow operation. More particularly, the invention discloses a glass lined micro-reactor that can be reassembled.

BACKGROUND OF THE INVENTION

Advent of micro-reactors has revolutionized the ways of carrying out process chemistry research in the last two decades. A large number of important reactions which otherwise could not have been carried out in an effective manner can now be easily carried out in micro-reactors by virtue of their improved mixing, heat transfer and mass transfer characteristics. Many micro-reactors are being widely used, and their scaled-up versions are available in a variety of materials viz. metals, polymers, ceramic, and glass. The metallic micro-reactors not only offer high heat transfer area per unit volume, small mixing lengths, high mass transfer rates (depending upon the channel geometry), but also give a very strong and robust option for process development from the laboratory scale to the commercial scales. However, while said metallic micro-reactors are robust, they are not useful for carrying out a large number of reactions which involve the use of corrosive chemicals. The aforementioned drawbacks of metallic micro-reactors may be overcome with the use of glass micro-reactors, which offer excellent corrosion resistance, sterility, and visibility.

However, glass micro-reactors also suffer from drawbacks. For instance, they are monolithic, are typically unable to withstand high pressure, and need delicate handling due to their inherently fragile properties. These limitations of the stand-alone metal micro-reactors and the stand-alone glass micro-reactors bring out the need for the development and use of a glass lined metal micro-reactor which offers the advantages of both the types of reactors in a synergistic manner. To overcome the drawbacks of the micro-rectors available in the art, the present application discloses a novel glass lined micro-reactor which is able to function without losing the key advantages of the currently available micro-reactors.

OBJECTS OF THE INVENTION

The main object of the present invention is to provide a glass lined metal micro-reactor with a high heat transfer area in a continuous flow operation.

Another object of the present invention is to provide a glass lined metal micro-reactor which may be assembled or reassembled as and when required.

Yet another object of the present invention is to provide a glass lined metal micro-reactor that can be used for carrying out reactions at high pressure and very low to elevated temperature.

Still another object of the present invention is to provide a glass lined metal micro-reactor that can be used for carrying out reactions involving toxic and corrosive chemicals.

SUMMARY OF THE INVENTION

Accordingly, the present invention provides a glass-lined metal micro-reactor [100] comprising:
 i. a glass lined reactor or mixer [203] sandwiched between a top flange [101] and a bottom flange [102], wherein micro fluidic channels are machined on said glass lined reactor or mixer [203];
 ii. a transparent or glass lined metal flat surface [106] below the top flange [101] that allows to observe flow regime in the glass lined reactor or mixer [203];
 iii. a cavity [204] in the bottom flange [102] that facilitates flow of heat transfer fluid through an inlet [201] and an outlet [202], wherein said cavity [204] can be closed with a bottom plate [205] having a metal surface, wherein the metal surface of said bottom plate [205] can touch the heat transfer fluid;
 iv. a connection plate [105] connecting the inlet [201] and the outlet [202] to the bottom flange [102] of the glass lined metal micro-reactor [100]; and
 v. multiple bolts [108] to hold tightly the top flange [101] and the bottom flange [102].

To accomplish the objectives listed herein above, the inventors provide a novel glass lined metal micro-reactor with micro fluidic channels that provide better mixing, better heat exchange and better temperature control. The micro fluidic channels machined in the glass lined metal reactor/mixer may be straight, curved, lamellar, flower shaped, or spiral such that the cross sectional area of the micro fluidic channel is configured to suit the cross sectional area of the glass lined metal micro-reactor.

In an embodiment, the invention provides a glass lined metal micro-reactor [100] with a high heat transfer area in continuous flow operation. The glass lined metal micro-reactor has a heat transfer area ranging from 500-2000 $m^2/m^3$.

In another embodiment, the invention provides a glass lined metal micro-reactor [100] which can be assembled and reassembled and can be operated at high pressure and elevated temperature.

In another embodiment, the glass lined metal micro-reactor [100] is designed to provide flow rate of wherein the flow through the micro fluidic channels is perpendicular to the cross-section of said channels.

In yet another embodiment, the invention provides glass lined metal micro-reactors that may be used either individually or may be stacked in series.

In another embodiment of the present invention, the glass lined metal micro-reactor [100] comprises a plurality of glass lined reactor or mixer [203], wherein said plurality of glass lined reactor or mixer [203] are arranged in parallel on same feed line, or in series one after another, or combinations thereof.

In yet another embodiment of the present invention, there is provided a glass lined metal micro-reactor [100], wherein said plurality of glass lined micro-reactors or mixer [203] are stacked such that outer surface [206] of the bottom plate

[205] covering heat transfer cavity is same as the glass lined micro-reactor or mixer [203] and is closed using another glass lined flat surface.

Yet another embodiment of the present invention provides a glass lined metal micro-reactor [100], wherein said micro-reactor can withstand pressure up to 50 bar and temperature ranging from −60° to 343° C.

Still another embodiment of the present invention provides a glass lined metal micro-reactor [100], wherein thickness of said glass lined metal micro-reactor [100] ranges from 0.5 mm to 20 mm.

Another embodiment of the present invention provides a glass lined metal micro-reactor [100], wherein wettability of inside glass surface of said glass lined micro-reactor or mixer [203] can be tuned from hydrophilic to super hydrophobic.

Further embodiment of the present invention provides a glass lined metal micro-reactor [100], wherein the micro fluidic channels machined on said glass lined reactor or mixer [203] are straight, curved, lamellar, flower shaped, or spiral.

DETAILED DESCRIPTION OF THE INVENTION

In order to overcome the drawbacks of the micro-reactors available in the art, without losing the key advantages, the present application discloses a novel glass lined micro-reactor. The disclosed glass lined micro-reactor allows the users to carry out fast reactions of corrosive chemicals under high pressure by providing adequate heat transfer area and flexibility of operations by offering a possibility of cleaning the micro-reactor. Most of the existing metal and glass micro-reactors do not offer these advantages.

The present invention discloses a novel glass lined metal micro-reactor that helps in retaining the agility and re-configurability of continuous processes with a better processing ability via intensification of mixing and reaction. The glass lined metal micro-reactor provides at least two orders of magnitude of heat transfer area in comparison to the conventional glass lined stirred tank reactors used in the chemical and allied industry, which typically have a heat transfer area ranging from 6 to 40 $m^2/m^3$. The glass lined metal micro-reactor eliminates most of the limitations of conventional glass lined stirred reactors without compromising its ability to handle toxic and very corrosive process materials. The large heat transfer area helps to achieve rapid heat transfer. The heat transfer area per unit volume is estimated based on the dimensions of the different domains in the system.

Figure 1:
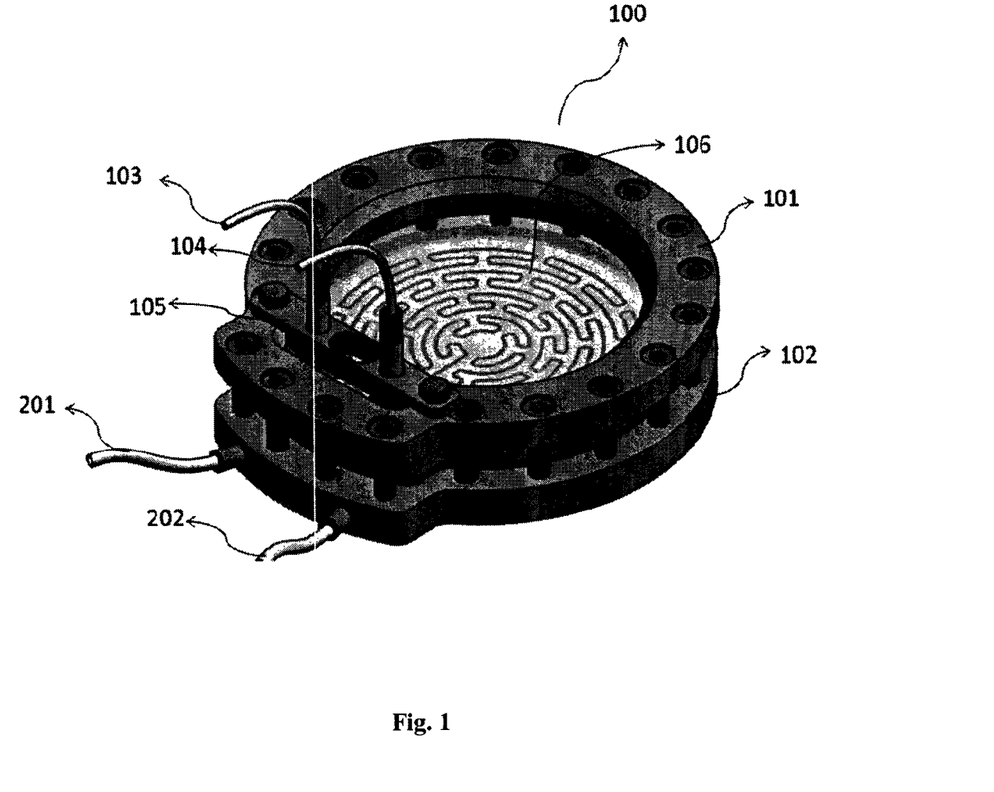
FIG. 1 depicts the assembly of glass lined micro-reactor [100] which comprises of a glass lined metal plate sandwiched between a top flange [101] and a bottom flange [102].

FIG. 1 depicts the assembly of glass lined micro-reactor [100]. The micro-reactor comprises of a glass lined reactor/mixer [203] sandwiched between a top flange [101] and a bottom flange [102]. The sequence follows top flange [101], a transparent or glass lined metal flat surface [106], glass lined reactor/mixer [203] and the bottom flange [102]. The entire assembly [100] including the two flanges are held tightly either using multiple bolts [108] or by external compression.

The top flange and the bottom flange are made of a material selected from mild steel, stainless steel, carbon steel, or other metals and alloys. The flat surface [106] can either be glass or glass lined metal plate wherein the glass is coated on the inner surface of the metal plate. Optionally, a metal jacket can be provided at the top. The shape of the glass lined micro-reactor [100] is selected from circular, square, rectangular or any other geometrical shape with a cross sectional area ranging from 1 mm$^2$ to 50 mm$^2$.

The glass lined metal micro-reactor [100] comprises a plurality of glass lined reactor or mixer [203], wherein said plurality of glass lined reactor or mixer [203] are arranged in parallel on same feed line, or in series one after another, or combinations of different sized glass lined reactors thereof.

Accordingly, said multiple micro-reactors are stacked such that the bottom plate [205] covering the heat transfer cavity has the same outer surface [206] as the glass lined reactor [203] and is closed using another glass lined flat surface.

Figure 2:
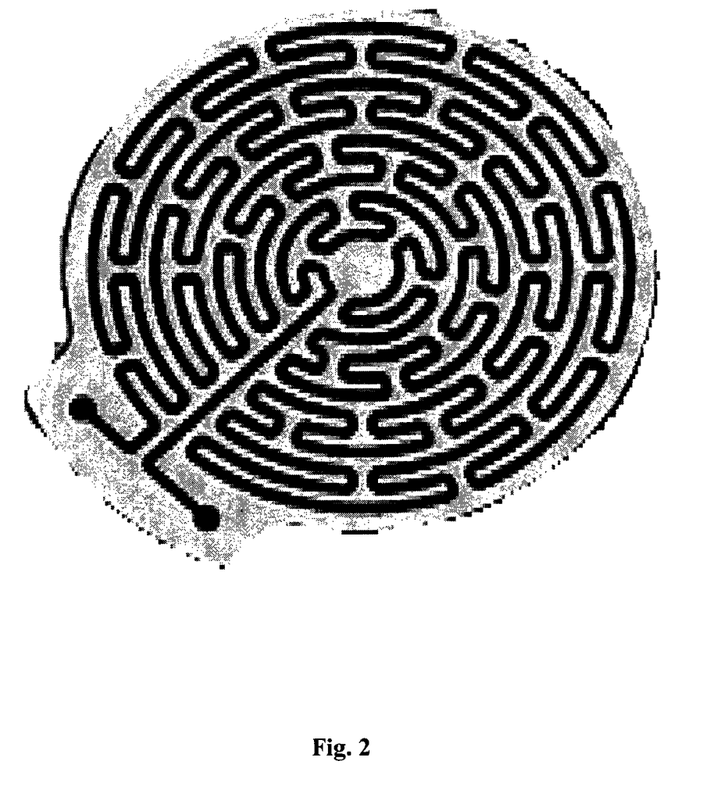
FIG. 2 depicts a view of the channels on the glass lined micro-reactor [100].
Figure 6:
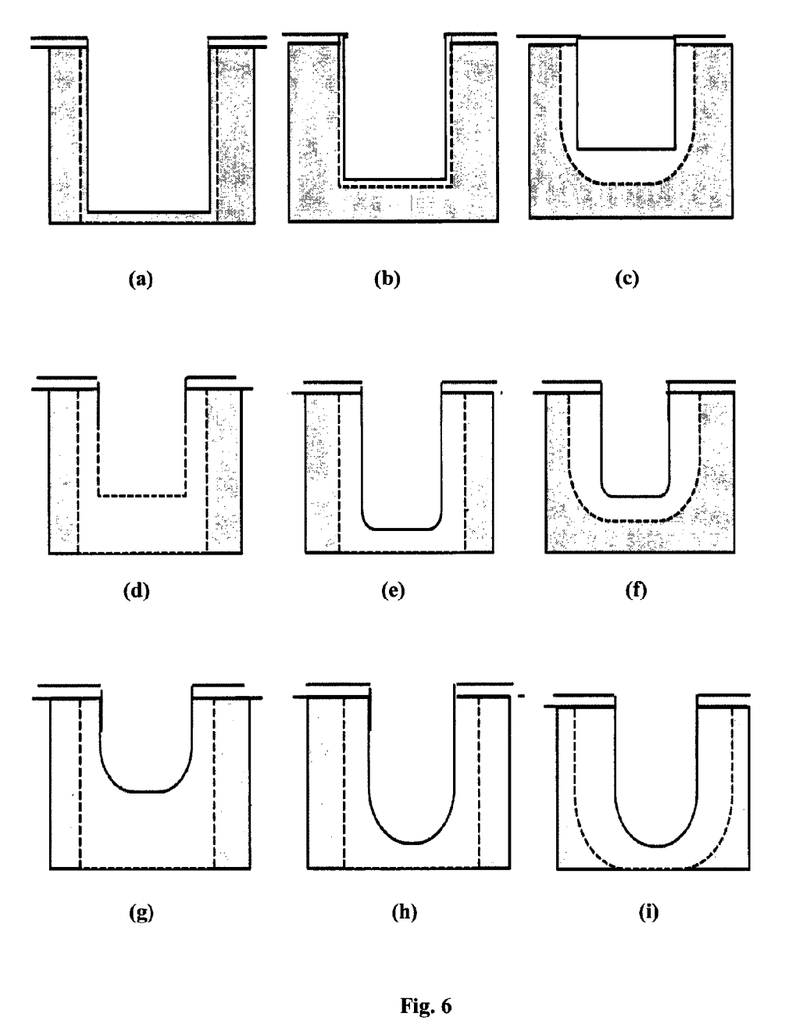
FIG. 6(a) depicts a cross-section of the machined channel in the metal and the glass-lined surfaces. Dotted region shows the machined channel dimension in the metal support. Solid line inside the dotted region shows the glass lined surface.
FIG. 6(b) depicts another cross-section of the machined channel in the metal and the glass-lined surfaces. Dotted region shows the machined channel dimension in the metal support. Solid line inside the dotted region shows the glass lined surface.
FIG. 6(c) depicts still another cross-section of the machined channel in the metal and the glass-lined surfaces. Dotted region shows the machined channel dimension in the metal support. Solid line inside the dotted region shows the glass lined surface.
FIG. 6(d) depicts yet another cross-section of the machined channel in the metal and the glass-lined surfaces. Dotted region shows the machined channel dimension in the metal support. Solid line inside the dotted region shows the glass lined surface.
FIG. 6(e) depicts a further cross-section of the machined channel in the metal and the glass-lined surfaces. Dotted region shows the machined channel dimension in the metal support. Solid line inside the dotted region shows the glass lined surface.
FIG. 6(f) depicts another cross-section of the machined channel in the metal and the glass-lined surfaces. Dotted region shows the machined channel dimension in the metal support. Solid line inside the dotted region shows the glass lined surface.
FIG. 6(g) depicts still another cross-section of the machined channel in the metal and the glass-lined surfaces. Dotted region shows the machined channel dimension in the metal support. Solid line inside the dotted region shows the glass lined surface.
FIG. 6(h) depicts yet another cross-section of the machined channel in the metal and the glass-lined surfaces. Dotted region shows the machined channel dimension in the metal support. Solid line inside the dotted region shows the glass lined surface.
FIG. 6(i) depicts a further cross-section of the machined channel in the metal and the glass-lined surfaces. Dotted region shows the machined channel dimension in the metal support. Solid line inside the dotted region shows the glass lined surface.
FIG. 6(j) depicts another cross-section of the machined channel in the metal and the glass-lined surfaces.
FIG. 6(k) depicts yet another cross-section of the machined channel in the metal and the glass-lined surfaces.
FIG. 6(l) depicts still another cross-section of the machined channel in the metal and the glass-lined surfaces.
FIG. 6(m) depicts another cross-section of the machined channel in the metal and the glass-lined surfaces.
FIG. 6(n) depicts a further cross-section of the machined channel in the metal and the glass-lined surfaces.

FIG. 2 gives an overview of the machined micro fluidic channels on the glass lined reactors configured suitable to the reactor [203]. The machined micro fluidic channels have varied cross-section which depend on the original cross-section of the glass lined metal plate, method of coating glass layers on this metal channel, number of glass coats and properties of glass. Different cross-sections of the machined channel in the metal and the glass-lined surfaces are shown in FIG. 6(a-n). The dotted region shows the machined channel dimension in the metal support. The solid line inside the dotted region shows the glass lined surface. Any damage in the channels during usage may be easily repaired by providing additional layers of glass coating. This significantly enhances the working life of the micro-reactors as compared to that of conventional glass micro-reactors.

Since the glass lining is on metal, the glass does not come into contact with anything but the process fluids. Hence, unlike the glass micro-reactors which upon increase in pressure or because of an external impact can break/crack, the glass lining of the present micro-reactor is free from the aforementioned drawbacks. Moreover, in case of any blockage of micro channels, the glass micro-reactors available in the art cannot be opened to clean the channels, which is however possible in the glass-lined metal micro-reactors disclosed herein.

The machined micro fluidic channels of the present invention can be straight, curved, lamellar or spiral. The machined channel micro fluidic channels are made of glass and are designed to provide channels of thickness ranging from 0.5 mm to 5 mm.

The glass lined metal micro-reactor [100] is designed to provide a flow through the cross-section of micro fluidic channels which is perpendicular to the cross-section of said channels.

Figure 3:
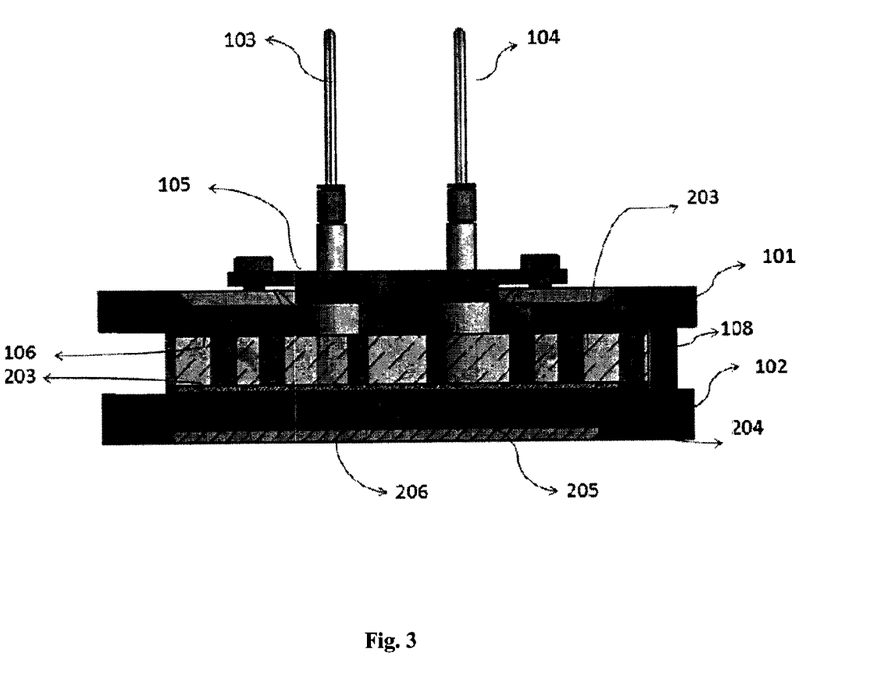
FIG. 3 depicts a cross-section of the glass lined micro-reactor.
Figure 4:
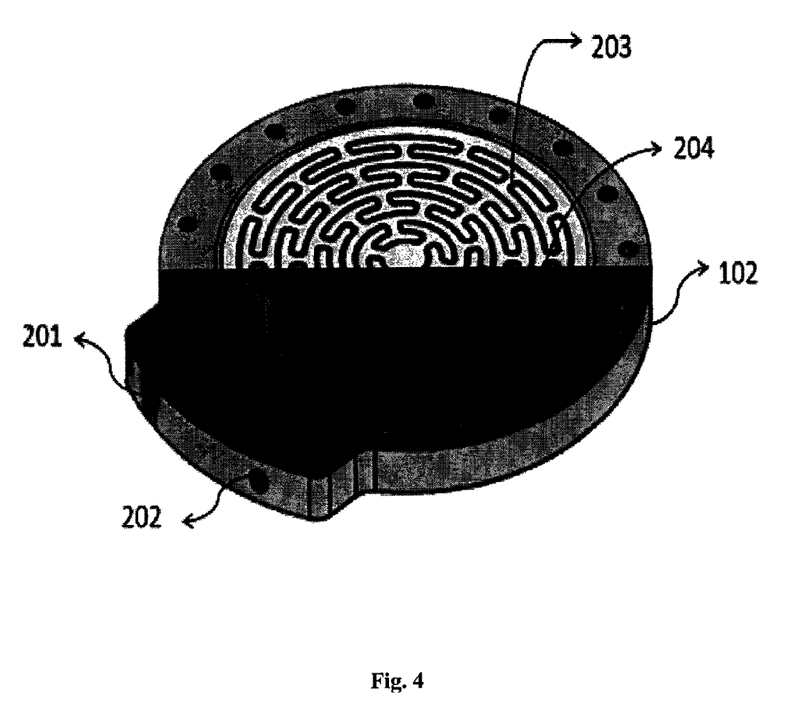
FIG. 4 depicts a view of the bottom section of the glass lined reactor and the heat transfer section.
Figure 5:
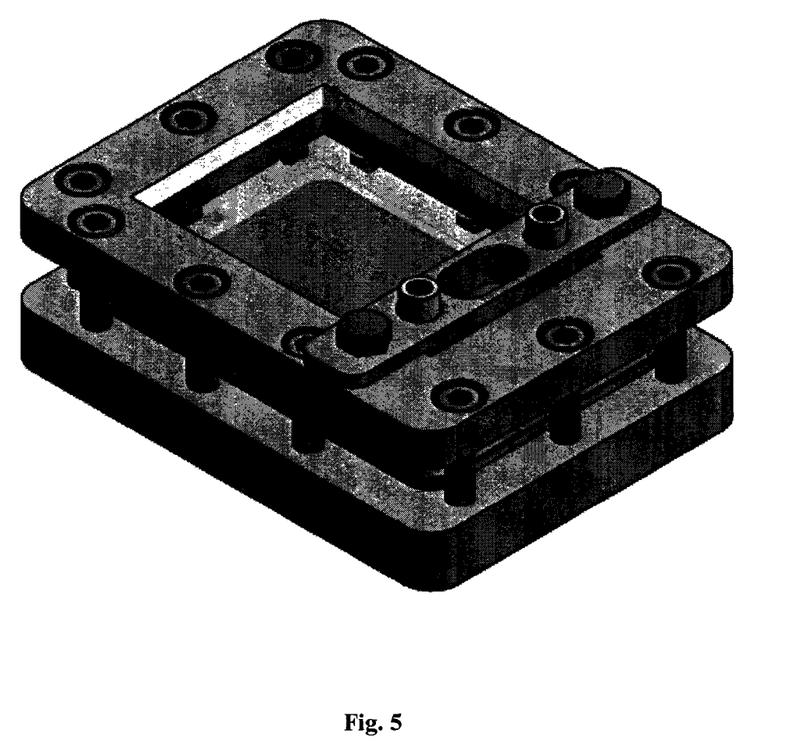
FIG. 5 depicts the assembled rectangular glass lined micro-reactor.

FIG. 3 provides cross sectional view of the micro-reactor. According to FIG. 3, the bottom flange has a cavity [204] that facilitates the flow of heat transfer fluid through an inlet [201] and an outlet [202]. The inlet and outlet channel sizes can have a thickness ranging from 3 mm to 15 mm. The bottom plate [205] that closes the cavity [204] can have metal surface touching the heat transfer fluid. The outer side [206] of the bottom plate [205] can either be made up of metal or glass-lined metal.

The heat transfer takes place by the heat transfer fluid through the jacket/cavity [204] in the bottom flange effectively transferring the heat of reaction which is formed or necessary in the reaction channels.

The inlet [103] and outlet [104] of the reactor for reaction fluids are connected to the reactor using a plate [105]. The connection plate [105] can be of metals, ceramic, polymer coated metals, Teflon or soft materials.

The inlet and outlet have a thickness ranging from 1 mm to 10 mm.

The thickness of said glass line reactor ranges from 0.5 mm to 20 mm.

The wettability of the inside glass surface can be tuned to anywhere between hydrophilic to super hydrophobic depending upon the requirement of the application by appropriately treating the glass surface.

The glass lined metal micro-reactor of the instant invention allows a thin layer of glass to withstand very high pressure and temperature conditions as it has a strong physical bonding with metal, which is usually not possible with conventional glass micro-reactors. Accordingly, the micro-reactors can withstand a pressure of 50 bar and temperature in the range of −60° to 343° C. The small channel sizes of the micro fluidic channels allows the micro-reactor to achieve large heat transfer area ranging from 500-2000 m$^2$/m$^3$, preferably 800 m$^2$/m$^3$ of glass lined metal micro-reactor.

Typical glass micro-reactors are sealed and cannot be opened for any physical cleaning purpose. This usually limits the usage and life of the glass micro-reactors. Glass lined metal micro-reactors of the present application overcomes this limitation and can be opened any time and reassembled back for usage.

Glasses of different types can be used for coating in layers to vary the thermal conductivity of the device in a range.

The glass lined metal micro-reactors can be used in carrying out reactions involving toxic and corrosive chemicals.

Industrial Applicability

Typical glass micro-reactors are not suitable for high pressure and at very low and very high temperature applications. Glass lined metal micro-reactors of the present application can be used at high pressure and over a wider range of temperature depending on the type of glass which is used (the temperature ranges from −60° to 343° C.). The heat transfer area is in the range of 800 2000 m$^2$/m$^3$ (heat transfer area is estimated as [(perimeter ×height)/(cross-sectional area ×height)].

The micro-reactor is amenable to cleaning, assembly, and disassembly.

While the present invention has been described in terms of its specific embodiments, certain modifications and equivalents will be apparent to those skilled in the art and are included within the scope of the invention. The description provided is merely an illustration of the particular aspects of the disclosure and do not limit the scope of the present invention.

We claim:

1. A glass lined metal micro-reactor comprising:
   i. a glass lined reactor or mixer sandwiched between a top flange and a bottom flange, wherein micro fluidic channels are machined on said glass lined reactor or mixer;
   ii. a transparent or glass lined metal flat surface below the top flange that allows to observe flow regime in the glass lined reactor or mixer;
   iii. a cavity in the bottom flange that facilitates flow of heat transfer fluid through an inlet and an outlet, wherein said cavity can be closed with a bottom plate having a metal surface, wherein the metal surface of said bottom plate can touch the heat transfer fluid;

iv. a connection plate connecting the inlet and the outlet to the bottom flange of the glass lined metal micro-reactor; and
v. multiple bolts to hold tightly the top flange and the bottom flange.

2. The glass lined metal micro-reactor as claimed in claim 1, wherein said micro-reactor comprises a plurality of glass lined reactor or mixer, wherein said plurality of glass lined reactor or mixer are arranged in parallel on same feed line, or in series one after another, or combinations thereof.

3. The glass lined metal micro-reactor as claimed in claim 2, wherein said plurality of glass lined micro-reactors or mixer are stacked such that outer surface of the bottom plate covering heat transfer cavity is same as the glass lined micro-reactor or mixer and is closed using another glass lined flat surface.

4. The glass lined metal micro-reactor as claimed in claim 1, wherein said micro-reactor has cross sectional area ranging from 1 $mm^2$ to 50 $mm^2$ and heat transfer area ranging from 500-2000 $m^2/m^3$.

5. The glass lined metal micro-reactor as claimed in claim 1, wherein said micro-reactor can withstand pressure up to 50 bar and temperature ranging from −60° to 343° C.

6. The glass lined metal micro-reactor as claimed in claim 1, wherein thickness of said glass lined metal micro-reactor ranges from 0.5 mm to 20 mm.

7. The glass lined metal micro-reactor as claimed in claim 1, wherein wettability of inside glass surface of said glass lined micro-reactor or mixer can be tuned from hydrophilic to super hydrophobic.

8. The glass lined metal micro-reactor as claimed in claim 1, wherein the micro fluidic channels machined on said glass lined reactor or mixer are straight, curved, lamellar, flower shaped, or spiral.

9. The glass lined metal micro-reactor as claimed in claim 1, wherein flow through the micro fluidic channels is perpendicular to cross-section of said channels.

10. The glass lined metal micro-reactor as claimed in claim 1, wherein said micro-reactor helps in retaining agility and re-configurability of continuous processes, has high heat transfer area and is able to withstand high pressure and very low to high temperature.

* * * * *